Figure 1:
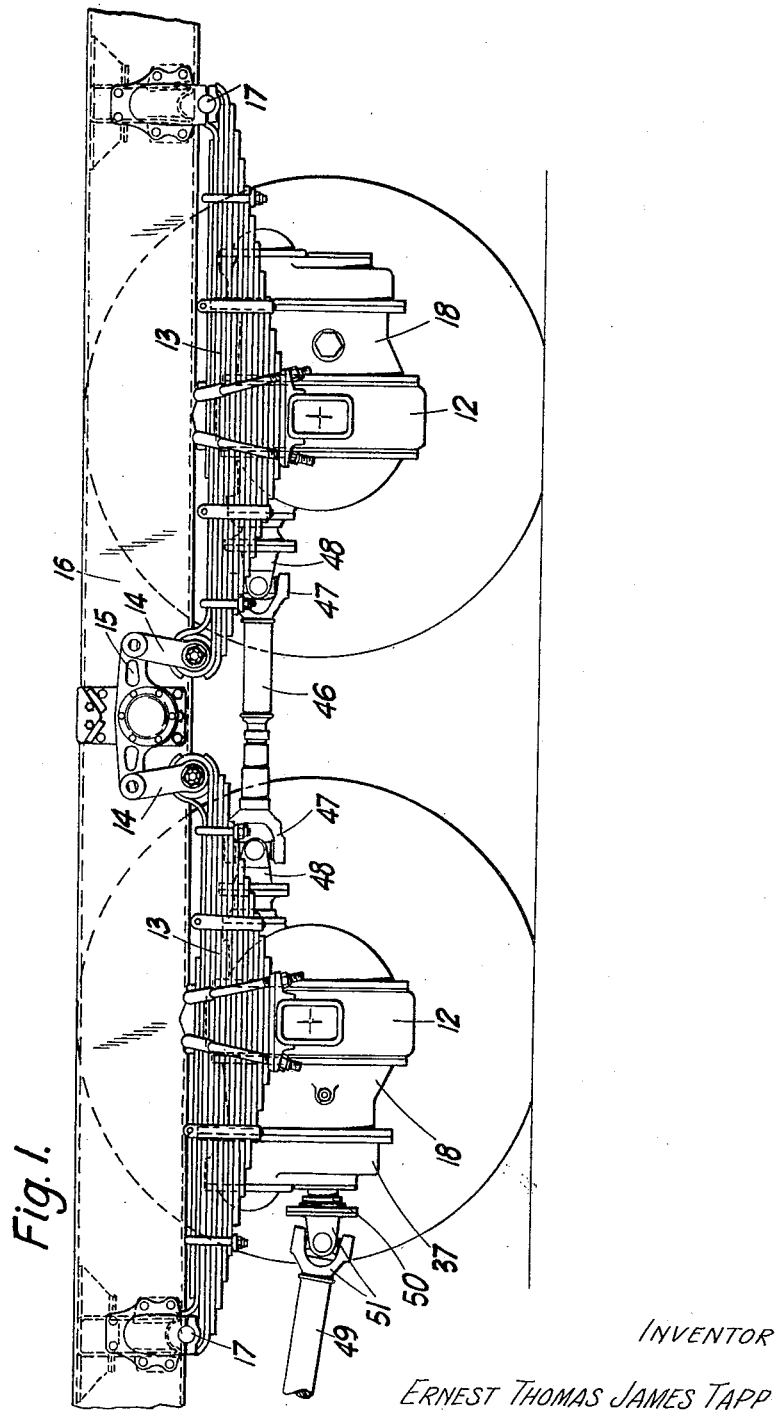

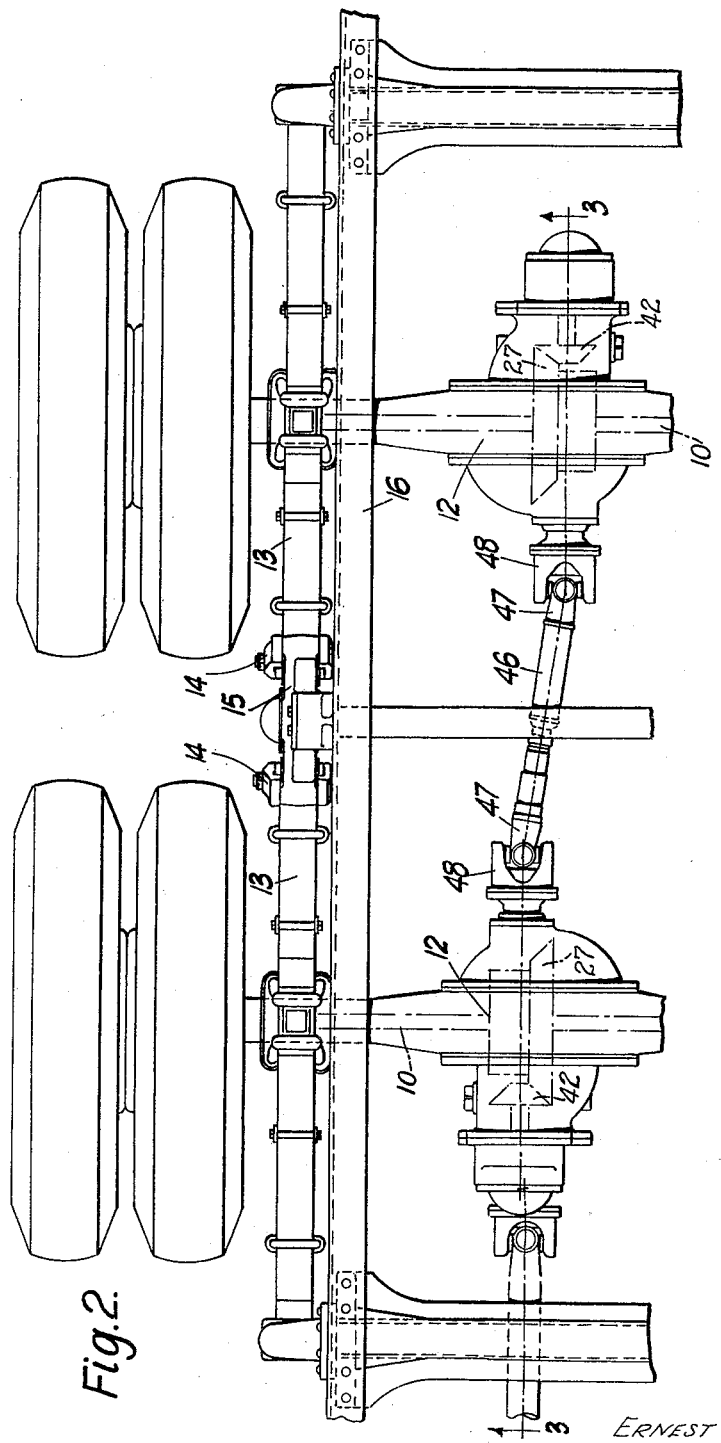

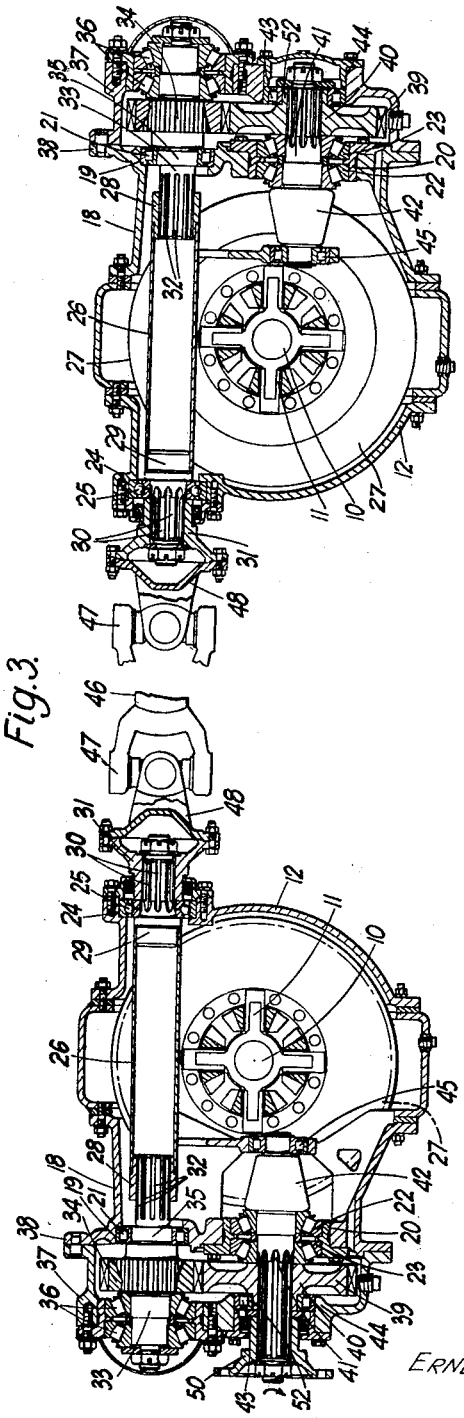

United States Patent Office

3,029,888
Patented Apr. 17, 1962

3,029,888
DRIVING TRANSMISSION FOR VEHICLES HAVING MULTIPLE DRIVEN WHEEL AXLES
Ernest Thomas James Tapp, Aldershot, England, assignor to County Commercial Cars Limited, Aldershot, Hampshire, England, a company of Great Britain
Filed Apr. 16, 1959, Ser. No. 806,865
3 Claims. (Cl. 180—22)

This invention relates to driving transmissions for vehicles having multiple driven wheel axles spaced apart in a fore and aft direction, and of the kind in which a main fore and aft extending driving shaft coupled to the vehicle gear box, in addition to driving a bevel pinion and crown wheel arrangement which in turn drives one of the wheel shafts, is provided with a pinion engaging a gear wheel on another fore and aft driving shaft which crosses said wheel shaft and is connected by a universal joint to one end of an intermediate driving shaft extending between two of the wheel shafts, and the other end of which intermediate shaft is connected by a universal joint to a further fore and aft driving shaft which drives the bevel pinion and crown wheel arrangement associated with a second of said wheel shafts. Usually the last mentioned bevel pinion is disposed on the same side of the second wheel shaft as said intermediate shaft and thus owing to the space required for the gearing and the universal joint the intermediate shaft is comparatively short in length and considerable angular flexing of the universal joints takes place due to the independent spring mounting of the axles and due to this angular movement the universal joint requires to provide for an axial component of movement and is thus complicated and expensive to manufacture also considerable wear may thus ensue.

In order to accommodate for said axial movement, which is considerable, the necessary length for the intermediate shaft has been obtained by spacing the two road wheel shafts a considerable distance apart and this has resulted in side scrub on the tire when turning the vehicle.

An object of the present invention is to overcome these difficulties.

According to this invention a driving transmission of the kind first referred to above is characterized in that the further shaft driven by the intermediate shaft extends across the second wheel shaft and in that said bevel pinion, of the pinion and crown wheel arrangement associated with the second wheel shaft, which bevel pinion is driven from said further shaft and is disposed on the opposite side of the second wheel shaft to the intermediate shaft. Thus in view of the absence of gearing between the two wheel shafts the intermediate shaft can be of considerably greater length than heretofore without the necessity of increasing the spacing of the two wheel shafts.

The bevel pinion of the pinion and crown wheel arrangement associated with the second wheel shaft may be mounted on a short fore and aft extending shaft, on which is also mounted a drive pinion driven by a meshing pinion fixed on said further shaft. The gear track on the crown wheel associated with the second wheel shaft is preferably arranged to face in the opposite direction to the gear track on the crown wheel associated with the first wheel shaft.

The two axle assemblages including the shafts which extend across the wheel shafts may be similar in construction but are so relatively disposed that the gearing associated with the first wheel shaft is on the forward side of that wheel shaft and the crown wheel on the wheel shaft faces in one direction while the gearing associated with the other wheel shaft is on the rear side of that shaft and the crown wheel on that wheel shaft faces in the opposite direction.

Each of the crown wheels and its driving pinion is preferably of hypoid bevel form.

In any of the arrangements referred to above each of those fore and aft shafts which cross a wheel shaft is preferably disposed within a casing which encloses the gearing driving the wheel shaft, and is carried by bearings supported by that casing.

The following is a more detailed description of the invention as applied to a vehicle having twin spaced back axles reference being made to the accompanying drawings in which:

FIGURE 1 is a side elevation of the rear part of the vehicle;
FIGURE 2 is a plan view of the arrangement shown in FIGURE 1; and
FIGURE 3 is a vertical section on the bent line 3—3 of FIGURE 2.

Each axle assemblage comprises two half shafts 10 and differential gearing 11 accommodated in a banjo type of casing 12 and each banjo type casing has anchored to the upper part thereof a half elliptical multiple leaf spring 13. The adjacent ends of the forward and rearward leaf springs are each connected respectively through links 14 to opposite ends of a rocker arm 15 which is pivotally mounted on a longitudinal chassis frame member. The ends of the forward and rearward leaf springs remote from each other are pivotally secured at 17 direct to said chassis frame member.

One part 18 of each banjo casing is provided with two bearing housings 19, 20 arranged one above the other. The upper housing 19 accommodates a roller bearing 21 with cylindrical rollers and the lower housing accommodates two roller bearings 22, 23 having conical rollers with the axes of the rollers of one bearing inclined to the axes of the rollers of the other bearing so as to provide for thrust in opposite directions. On the opposite side of the banjo casing is another bearing housing 24 in axial alignment with the housing 19 and in this instance the housing accommodates a ball bearing 25. The coaxially arranged bearings 21, 24 are arranged to support a shaft 26 which is disposed above the two half shafts 10 and to one side of the crown wheel 27. This shaft 26 has a tubular centre part to which is welded at one end an internally splined sleeve 28 and the other end has inserted and welded in it a stub shaft 29 supported by the ball bearing 25 which stub shaft is provided with external splines 30. The splines on the stub shaft are engaged by internal splines in a hub 31 of one part of a universal joint. Each internally splined sleeve 28 is engaged by splines 32 on one end of a spindle 33 projecting from both sides of a pinion 34, which splined end also has a journal portion 35 supported by the first said roller bearing 21, the spindle on the opposite side of the pinion 34 is supported by another double conical roller bearing 36 housed in an additional casing part 37 secured to a flange 38 on the banjo axle casing. Each latter pinion 34 engages a gear wheel 39 having an internally splined hub portion 40 which engages a splined spindle 41 formed with a hypoid pinion 42 which engages a hypoid gear track on the crown wheel 27 of the differential gear. Each spindle 41 has a journal portion supported by the first double conical roller bearings 22, 23. The hub portion 40 of said gear wheel 39 is formed with a journal portion 52 surrounded by the inner race of a roller bearing 43 which is supported in a housing 44 in the additional casing part 37. The bearings 22, 23, 45 which support the spindle of each hypoid pinion 42 are so arranged that their common axis is disposed below the axis of rotation of the crown wheel 27.

The two axle assemblages are constructed in the above manner and are so arranged that the additional gear casing 37 housing the gearing 34, 39 for driving the hypoid pinion 42 are disposed on those parts of the banjo casing which are furthest from one another. The two crown wheels 27 are arranged to face in opposite directions and as will be seen from FIGURE 2 this entails the two transmissions being out of alignment and the intermediate shaft 46 which connects them, being inclined to the fore and aft axis of the vehicle. The intermediate fore and aft extending driving shaft 46 is provided at each end thereof with one part of a "Hookes" type universal joint the other part 48 of each of which joints is attached to the splined hub 31 fixed to the shaft 26 crossing the two half shafts 10. The two axle assemblages are not quite identical since the splined spindle 41 of the hypoid pinion 42 of that assemblage which is driven by the main fore and aft extending shaft 49 (FIGURE 1) requires to be longer than the other spindle 41 so as to project out from the additional gear casing 37 and accommodate an internally splined hub portion 50 of another universal joint 51.

I claim:
1. A driving transmission for a motor vehicle having two wheel axles spaced apart in a fore-and-aft direction, comprising a first gear box associated with a first of said wheel axles, a first crown wheel in said first gear box operatively connected to said first wheel axle for driving said first wheel axle, a first spindle mounted in said first gear box, a main fore-and-aft extending driving shaft, means for connecting one end of said main driving shaft to one end of said first spindle to drive said first spindle, a first bevel pinion mounted on the other end of said first spindle, said first bevel pinion meshing with said first crown wheel to drive said first crown wheel, another fore-and-aft extending driving shaft disposed at a higher level than but in the same vertical plane as said main driving shaft while crossing above said first wheel axle, step-up gearing operatively connected between the fore end of said other driving shaft and said main driving shaft for driving said other driving shaft at an increased speed in relation thereto, a second gear box associated with a second of said wheel axles, a second crown wheel in said second gear box operatively connected to said second wheel axle for driving said second wheel axle, a second spindle mounted in said second gear box, a second bevel pinion mounted on said second spindle, said second bevel pinion meshing with said second crown wheel to drive said second crown wheel, said first crown wheel facing in a direction opposite to that of said second crown wheel, a further fore-and-aft driving shaft disposed in the same horizontal plane as said other driving shaft but in a vertical plane different from the vertical plane in which said main driving shaft and other driving shaft are disposed, said further driving shaft crossing above said second wheel axle, gearing means operatively connected between the aft end of said further driving shaft and said second spindle for driving said second spindle, and an intermediate driving shaft having one end operatively connected to the aft end of said other driving shaft and the other end operatively connected to the fore end of said further driving shaft, said other driving shaft driving said intermediate driving shaft while said further driving shaft is driven by said intermediate driving shaft, said other driving shaft and further driving shaft being lighter in weight than said main driving shaft since less torque is needed to drive said other driving shaft and further driving shaft at their increased speed with respect to said main driving shaft, said intermediate shaft being inclined to the fore-and-aft axis of the vehicle.

2. A driving transmission according to claim 1 in which said second spindle is shorter than said first spindle, and said gearing means includes a driven pinion mounted on said second spindle, said driven pinion being driven by a meshing pinion of smaller diameter fixed on the aft end of said further driving shaft.

3. A driving transmission according to claim 1 wherein each of the crown wheels and associated bevel pinions are of hypoid bevel form and the main driving shaft is arranged at a lower level than the wheel axle.

References Cited in the file of this patent
UNITED STATES PATENTS

| | | |
|---|---|---|
| 1,959,585 | Ingersoll | May 22, 1934 |
| 2,064,262 | Keese | Dec. 15, 1936 |
| 2,295,213 | Holmstrom | Sept. 8, 1942 |
| 2,477,925 | Gentry | Aug. 2, 1949 |
| 2,607,431 | Buckendale | Aug. 19, 1952 |
| 2,795,969 | McCarthy | June 18, 1957 |

FOREIGN PATENTS

| | | |
|---|---|---|
| 301,584 | Great Britain | Dec. 6, 1928 |
| 47,797 | France | July 17, 1937 |